E. P. CONNER.
Detaching Horses.
No. 60,836. Patented Jan. 1, 1867.
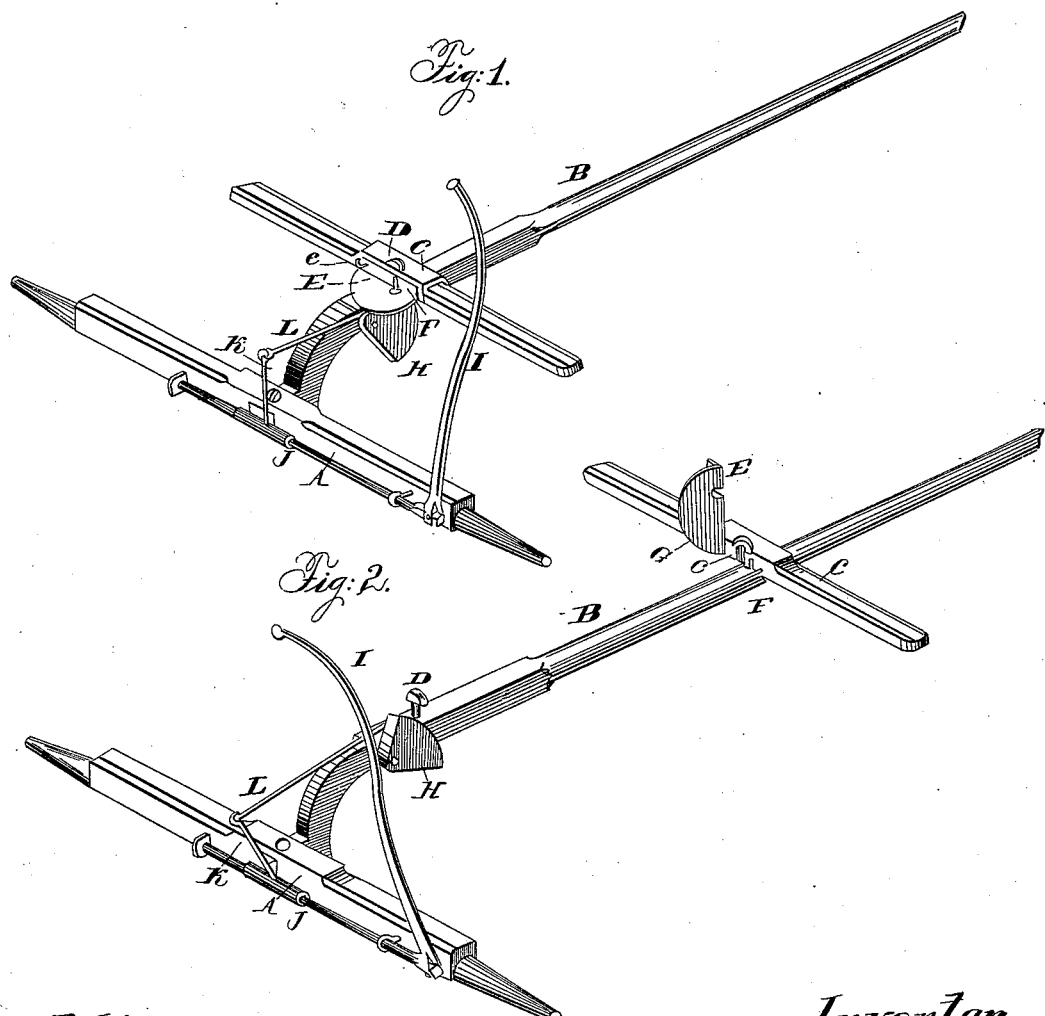

United States Patent Office.

EDWARD P. CONNOR, OF JEFFERSONVILLE, OHIO.

Letters Patent No. 60,836, dated January 1, 1867.

---

IMPROVEMENT IN DEVICE FOR DETACHING RUNAWAY HORSES.

---

The Schedule referred to in these Letters Patent and making part of the same.

---

TO ALL WHOM IT MAY CONCERN:

Be it known that I, EDWARD P. CONNOR, of Jeffersonville, Fayette county, Ohio, have invented a new and useful Device for Detaching Runaway Horses; and I do hereby declare the following to be a full, clear, and exact description thereof, reference being had to the accompanying drawings, making part of this specification.

This invention is designed as an improvement on appliances for the instantaneous detaching of one or more runaway hoses from a vehicle.

Figure 1 is a perspective view of my improvement applied to a two-horse vehicle.

Figure 2 represents the parts detached.

A B and C, represent respectively the fore axle, the tongue, and the double-tree of a two-horse carriage. The king-bolt, D, instead of traversing the double-tree at its mid-width, occupies a notch, $c$, in the rear side thereof, being secured therein by a cap, E, which being linked, $e$, at one end to the tree, its free end is temporarily held to the tree by the detent F, which projects upward from at or near the bottom of the tree. G is a flange, projecting horizontally rearward from the lower edge of the cap. H is a cam, so pivoted to the side of the tongue as to have its upper surface flush with that of the tongue in its inactive or depressed position, (see fig. 1,) and so as in its active position to rise above the tongue the full width of the cap, so as to lift the latter clear of the detent, and thus liberate the double-tree and all that may be attached to it, (see fig. 2.) The cam is operated by means of a lever, I, projecting vertically from a shaft, J, journalled to some suitable part of the carriage, and having an arm, K, which is connected by a rod, L, with the cam H.

I claim herein as new, and of my invention—

The arrangement of cap E $e$ G, notch $c$, detent F, and cam H, or their equivalents, constructed and operating as set forth.

In testimony of which invention I hereunto set my hand.

E. P. CONNOR.

Witnesses:
GEO. H. KNIGHT,
JOHN G. DOUGLASS.